United States Patent
Lee et al.

(10) Patent No.: US 9,355,507 B1
(45) Date of Patent: May 31, 2016

(54) SYSTEM AND METHOD FOR COLLECTING DATA OF VEHICLE

(71) Applicant: Hyundai Motor Company, Seoul (KR)

(72) Inventors: Dong Youl Lee, Gyeonggi-do (KR); Jae Am Seo, Gyeonggi-do (KR); Myeong Gyu Jeong, Gyeonggi-do (KR); Young Su Kim, Gyeonggi-do (KR); Chul Min Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/843,335

(22) Filed: Sep. 2, 2015

(30) Foreign Application Priority Data

Dec. 9, 2014 (KR) .................. 10-2014-0176050

(51) Int. Cl.
*G07C 5/08* (2006.01)
*G07C 5/00* (2006.01)

(52) U.S. Cl.
CPC .............. *G07C 5/0841* (2013.01); *G07C 5/008* (2013.01)

(58) Field of Classification Search
CPC .............................. G07C 5/0841; G07C 5/008
See application file for complete search history.

(56) References Cited

U.S. PATENT DOCUMENTS

| | | | | |
|---|---|---|---|---|
| 8,892,451 B2 * | 11/2014 | Everett | ................... | G06Q 40/08 340/439 |
| 9,269,202 B2 * | 2/2016 | Phelan | ................... | G06Q 40/00 |
| 2006/0111825 A1 * | 5/2006 | Okada | ............... | B60W 50/0205 701/48 |
| 2007/0216521 A1 * | 9/2007 | Guensler | .............. | G08G 1/0104 340/439 |
| 2007/0299575 A1 * | 12/2007 | Yamada | ................. | G06Q 10/20 701/31.4 |
| 2013/0013348 A1 * | 1/2013 | Ling | ..................... | G06Q 40/08 705/4 |
| 2013/0132586 A1 * | 5/2013 | Farmer | ................ | H04L 12/1822 709/226 |
| 2013/0227650 A1 * | 8/2013 | Miyake | ................... | H04L 63/08 726/3 |
| 2013/0253797 A1 * | 9/2013 | McNew | ................ | G06N 99/005 701/98 |
| 2013/0261942 A1 * | 10/2013 | McQuade | .............. | F02D 29/02 701/115 |
| 2014/0222298 A1 * | 8/2014 | Gurin | ................ | B60W 50/085 701/49 |
| 2014/0318236 A1 * | 10/2014 | Lingle | ................ | G01F 23/0061 73/290 R |
| 2014/0365028 A1 * | 12/2014 | Lee | ...................... | G07C 5/008 701/1 |
| 2014/0379171 A1 * | 12/2014 | Kim | ..................... | G07C 5/008 701/2 |
| 2015/0084584 A1 * | 3/2015 | Monks | .................... | H02J 7/025 320/108 |
| 2015/0279125 A1 * | 10/2015 | Chronowski | .......... | G07C 5/008 701/29.2 |

FOREIGN PATENT DOCUMENTS

| JP | 2008-135025 A | 6/2008 |
|---|---|---|
| JP | 2008-211644 A | 9/2008 |

(Continued)

*Primary Examiner* — Rodney Butler
(74) *Attorney, Agent, or Firm* — Mintz Levin Cohn Ferris Glovsky and Popeo, P.C.; Peter F. Corless

(57) ABSTRACT

A system for collecting vehicle data includes: at least one vehicle controller in a vehicle network configured to control driving of a vehicle; a server configured to monitor a load state of the vehicle network and request a data collection by adjusting a control parameter corresponding to a selected vehicle controller according to an available capacity in the vehicle network when any one of the at least one vehicle controller is selected; and a data collection device configured to request data corresponding to the control parameter according to a request of the server by determining an error range based on the load state of the vehicle network. The at least one vehicle controller detects the data corresponding to the control parameter and arranges and transmits the data corresponding to the control parameter based on the load state of the vehicle network and the error range.

12 Claims, 11 Drawing Sheets

(56) References Cited

FOREIGN PATENT DOCUMENTS

| | | | |
|---|---|---|---|
| JP | 2011-076322 A | 4/2011 |
| JP | 2013-038711 A | 2/2013 |
| KR | 2008-0016260 A | 2/2008 |
| KR | 10-2014-0078839 A | 6/2014 |

* cited by examiner

SYSTEM AND METHOD FOR COLLECTING DATA OF VEHICLE

CROSS-REFERENCE TO RELATED APPLICATION

This application claims the benefit of and priority to Korean Patent Application No. 10-2014-0176050, filed on Dec. 9, 2014 in the Korean Intellectual Property Office, the disclosure of which is incorporated herein in its entirety by reference.

TECHNICAL FIELD

The present disclosure relates generally to a system and a method for collecting data of vehicle, and more particularly, to a technology for controlling data collection according to load of vehicle network.

BACKGROUND

Data generated by a controller in a vehicle may be collected by connecting to a vehicle network through a wireless network. Since the vehicle network is usually implemented by a wired network, its load amount is restricted. In this regard, the transmission and reception of data between controllers is usually adjusted to the extent of not exceeding a network load amount limit. However, when vehicle data, which is variably selected, is requested to the controller, a significant network load may occur, causing essential vehicle data to not be transmitted between controllers.

Notably, in a normal network situation, an excess load amount may be solved after stopping network service for a while. However, in a vehicle network, if the transmission and reception of data is stopped due to the excess of network load amount, it could lead to a fatal accident or cause unexpected problems for vehicle operation.

SUMMARY

The present disclosure has been made in view of the above problems and provides a system and a method for collecting data of vehicle capable of actively inducing to avoid network load of vehicle when adjusting a policy according to vehicle data collection as a server monitors a vehicle network state periodically.

In accordance with embodiments of the present disclosure, a system for collecting a vehicle data includes: at least one vehicle controller in a vehicle network configured to control driving of a vehicle; a server configured to monitor a load state of the vehicle network and request a data collection by adjusting a control parameter corresponding to a selected vehicle controller according to an available capacity in the vehicle network when any one of the at least one vehicle controller is selected; and a data collection device configured to request data corresponding to the control parameter according to a request of the server by determining an error range based on the load state of the vehicle network. The at least one vehicle controller detects the data corresponding to the control parameter and arranges and transmits the data corresponding to the control parameter based on the load state of the vehicle network and the error range.

The server may include a simulator configured to determine the available capacity in the vehicle network based on a difference between a load amount threshold for the vehicle network and an average network load amount and compare the available capacity with a size of a control parameter selected in response to the selected vehicle controller.

The server may include a script generation unit configured to generate a script including the selected control parameter when the size of the selected control parameter does not exceed the available capacity according to the comparison of the simulator.

The data collection device may include a capacity analysis unit configured to determine the load state of the vehicle network in real-time or at every predetermined period and provide the determined load state to the server.

The data collection device may include an error range determination unit configured to compare a difference between an average network load amount for the vehicle network and an actual network load amount of the vehicle network and determine an error range of the actual network load amount.

The at least one vehicle controller may include: a data detection unit configured to detect data corresponding to the control parameter by determining a control parameter included in the data collection request received from the data collection device; and a data allocation unit configured to separate the data detected by the data detection unit based on a control parameter unit and allocate data based on the error range for each data transmission period.

The data allocation unit allocates sequentially the data separated based on the control parameter unit to a data allocation space of a data stream corresponding to each data transmission period based on a network load amount and an error range, and when a size of data allocated in a certain period exceeds the data allocation space of a corresponding data stream, allocates firstly data corresponding to the remaining allocation space among unallocated data except data allocated secondly in a corresponding period.

Furthermore, according to embodiments of the present disclosure, a method for collecting a vehicle data includes: receiving, by a data collection device, a command script from a server including a control parameter selected according to an available capacity for a vehicle network connected to a vehicle controller for controlling driving of a vehicle; determining, by the data collection device, an error range according to a load state of the vehicle network in response to a request of the server; transmitting, by the data collection device, the command script received from the server and the error range to the vehicle controller; receiving, by the data collection device, data corresponding to the control parameter included in the command script from the vehicle controller according to the error range; and sending, by the data collection device, the data received from the vehicle controller to the server. The data corresponding to control parameters are separated based on the control parameter and arranged for each period according to the load state of the vehicle network and the error range.

The method may further include, before the receiving of the command script from the server: determining, by the server, an available capacity of the vehicle network based on a difference between a load amount threshold for the vehicle network and an average network load amount; and generating, by the server, the command script including the selected control parameter when a size of the selected control parameter does not exceed the available capacity.

The transmitting of the command script and the error range to the vehicle controller may include: comparing a difference between an average network load amount of the vehicle network and an actual network load amount of the vehicle network; and determining an error range of the actual network load amount.

The method may further include, before the receiving of the data corresponding to the control parameter: detecting, by the vehicle controller, data corresponding to the control parameter by determining control parameters included in the command script; separating, by the vehicle controller, the detected data based on a control parameter unit; and sequentially allocating, by the vehicle controller, the data separated based on the control parameter unit to a data allocation space of a data stream corresponding to each data transmission period depending on a network load amount and the error range.

The sequential allocating of the data may include: when a size of data allocated in a certain period exceeds the data allocation space of a corresponding data stream, allocating firstly data corresponding to the remaining allocation space among unallocated data except data allocated secondly in a corresponding period.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF THE EMBODIMENTS

Figure 1:
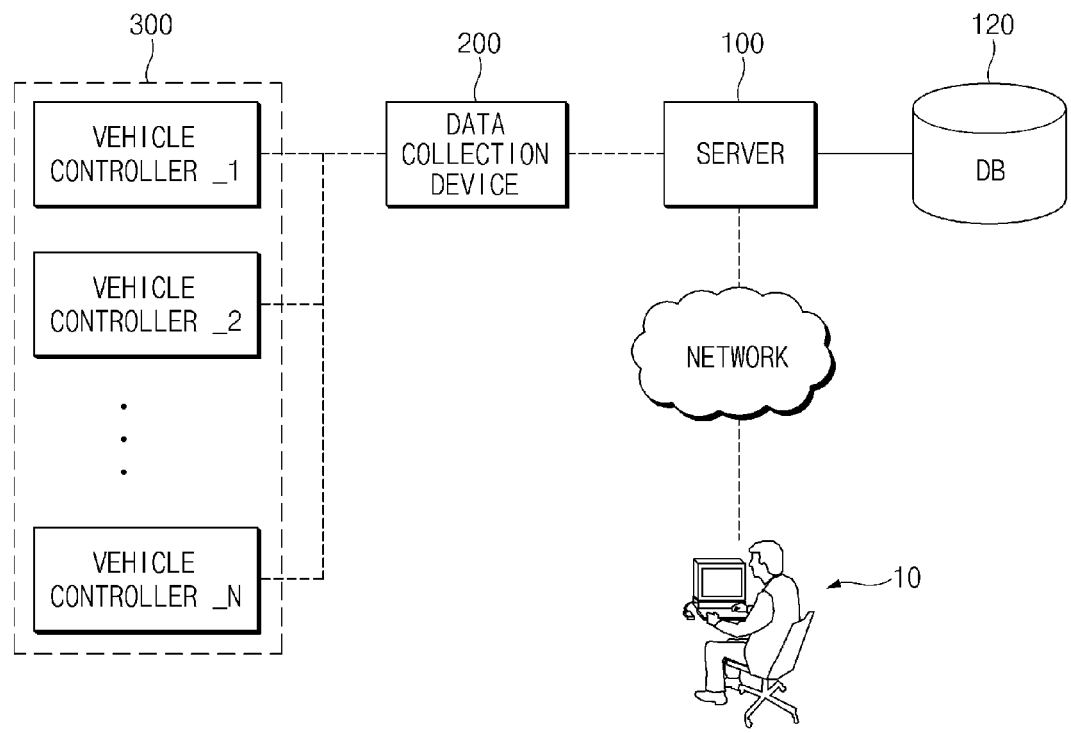
FIG. 1 is a diagram illustrating a configuration of a vehicle data collection system according to embodiments of the present disclosure.

Embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Prior to a detailed description of the present disclosure, terms and words used in the specification and the claims shall not be interpreted as commonly-used dictionary meanings, but shall be interpreted as to be relevant to the technical scope of the disclosure based on the fact that the inventor may property define the concept of the terms to explain the disclosure in best ways. Therefore, the embodiments and the configurations depicted in the drawings are illustrative purposes only and do not represent all technical scopes of the embodiments, so it should be understood that various equivalents and modifications may exist at the time of filing this application. Some constituent elements shown in the drawings may be exaggerated, omitted or schematically drawn for the purpose of convenience or clarity.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the disclosed embodiments, FIG. 1 is a diagram illustrating a configuration of a vehicle data collection system according to embodiments of the present disclosure.

As shown in FIG. 1, the vehicle data collection system (hereinafter, referred to as "collection system") according to the present disclosure may include a server 100, a data collection device 200, and a vehicle controller 300.

The vehicle controller 300 may be equipped in the vehicle, and may be one of multiple vehicle controllers. The vehicle controller 300 may correspond to, for example, an electronic control unit (ECU) that controls the operation of each operation unit of vehicle, and may correspond to an ECU that controls a vehicle communication. In addition, it may correspond to any ECU that controls a specific operation in the vehicle.

The server 100 may collect data for a plurality of vehicle controllers 300 provided in the vehicle. In this case, the server 100 may store the collected data in a database (DB) 120, and may use information stored in the DB 120 to analyze the vehicle state.

The server 100 may receive a selection of vehicle controller 300 which would collect data before requesting the data to the vehicle controller 300. In this case, the server 100 may select the vehicle controller 300 randomly or sequentially, and may receive a selection of a specific controller from user.

Furthermore, when the vehicle controller 300 is selected, the server 100 may select a parameter corresponding to data item to be collected from the selected vehicle controller 300. In this case, the server 100 may check load state of vehicle network which is connected to the vehicle controller 300, and may configure a control parameter based on available capacity of vehicle network. The load state of vehicle network may be provided in real-time or at every predetermined period from the data collection device 200 which is connected to the vehicle network.

The data collection device 200 may determine the load amount of vehicle network in real-time or at every predetermined period and provide to the server 100. In addition, the data collection device 200 may be disposed between the vehicle controller 300 and the server 100, and transmit a data collection request from the server 100 to the vehicle controller 300. In this case, the data collection device 200 may determine an error range for actual network load amount based on an average load amount of vehicle network and provide information on error range to the vehicle controller 300.

The vehicle controller 300 may detect the data of parameter requested from the data collection device 200, and classify each requested data according to parameter unit based on the error range and allocate for each period depending on capacity and transmit to the data collection device 200. In this case, the data collection device 200 may provide the data received from the vehicle controller 300 to the server 100 in response to the request from the server 100.

A detailed configuration and operation of the server 100, the data collection device 200, and the vehicle controller 300 will be described below.

Figure 2:
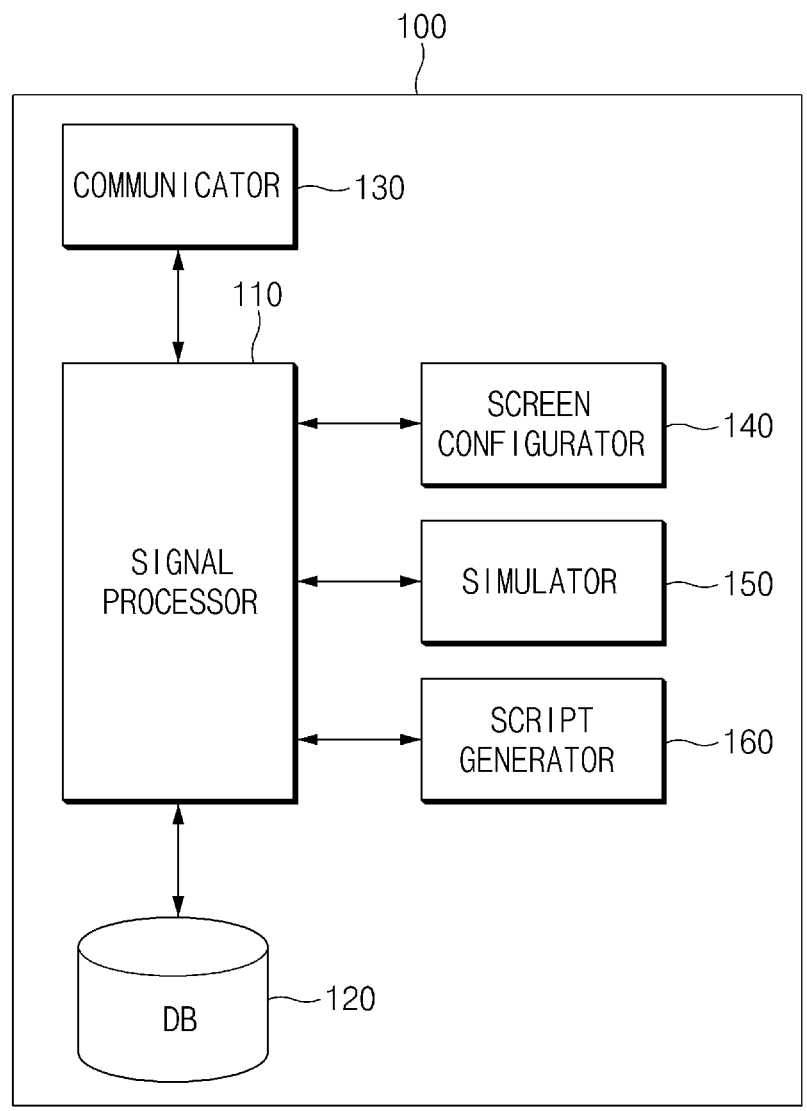
FIG. 2 is a block diagram illustrating a configuration of a server according to embodiments of the present disclosure.

FIG. 2 is a block diagram illustrating a configuration of a server according to embodiments of the present disclosure.

As shown in FIG. 2, the server 100 according to the present disclosure may include a signal processing unit 110, a DB 120, a communication unit 130, a screen configuration unit 140, a simulator 150, and a script generation unit 160. The signal processing unit 110 may process a signal transmitted between respective units of the server 100.

The DB 120 may store vehicle data received through the communication unit 130. In addition, the DB 120 may store a load amount threshold for the vehicle network, and may store the actual load amount of vehicle network received through the communication unit 130. In addition, the DB 120 may store an average network load amount for vehicle network load amount for a period of time. In this case, the average network load amount may be set to a reference value for determining a network available capacity.

The communication unit 130 may include a communication module supporting a communication interface with the data collection device connected to the vehicle network. In this case, the communication module may support wireless Internet access. Here, the wireless Internet technology may include Wireless LAN (WLAN), Wireless Broadband (Wibro), Wi-Fi, World Interoperability for Microwave Access (Wimax), High Speed Downlink Packet Access (HSDPA), and the like.

The communication unit 130 may be connected to communicate with the data collection device, transmit a data collection request to the data collection device and, in response, may receive the data of vehicle controller from the data collection device.

The screen configuration unit 140 may configure and provide a screen requested by a user terminal, at the time of connecting to the user terminal. As an example, the screen configuration unit 140 may configure and provide a screen to set a condition for data collection. If the server 100 is provided with a display means, the screen configuration unit 140 may provide the screen to set a condition for data collection through the display means, when a request is received from administrator.

Figure 3A:
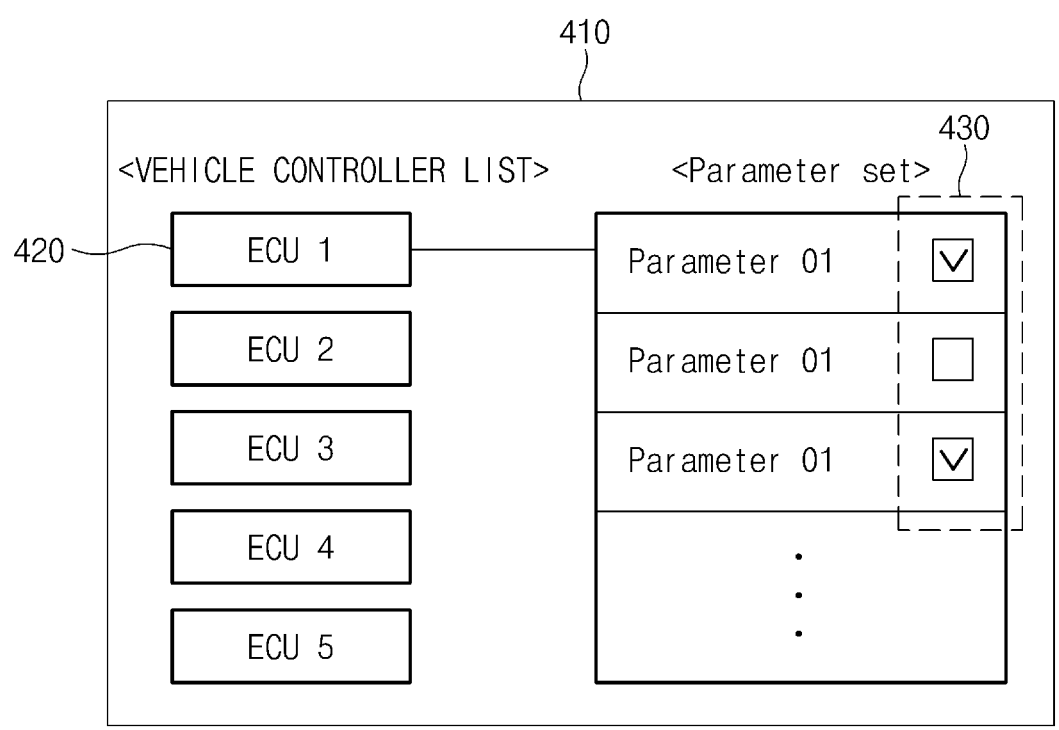
FIGS. 3a, 3b and 4 are exemplary diagrams for illustrating an operation of a server.

In this case, a data collection condition setting screen provided by the screen configuration unit 140 may be illustrated as shown in FIG. 3a.

As shown in FIG. 3a, a data collection condition setting screen 410 may include a controller list for registered vehicle. In addition, any one controller, that is, a ECU1 420 is selected from among a plurality of controllers 'ECU1', 'ECU2', 'ECU3', 'ECU4', 'ECU5' included in the controller list, the screen configuration unit 140 may display parameter set as in the data collection condition setting screen 410 by extracting control parameter information corresponding to the ECU1. In this case, the screen configuration unit 140 may display the parameter set and a check box 430 simultaneously on the data collection condition setting screen 410 so that user may select at least one of a plurality of parameters 'Parameter 01', 'Parameter 02', ' Parameter 03', . . . included in the parameter set.

Figure 3B:
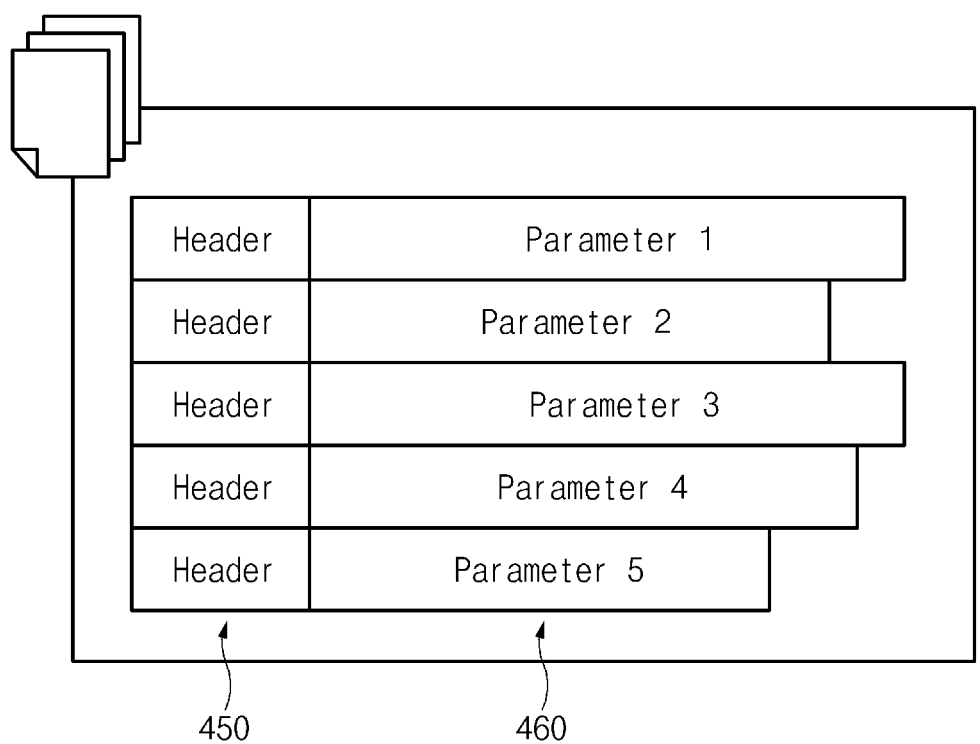

Meanwhile, as shown in FIG. 3b, the simulator 150 may generate a data set including each parameter selected from the data collection condition setting screen 410. The data set generated by the simulator 150 may include respective parameter information 460 and header information 450.

In this case, the simulator 150 may calculate a size of data set including respective parameter and header of FIG. 3b, and accumulate the size of the data corresponding to the selected parameter. The simulator 150 may compare the accumulated size for selected parameters with the network available capacity according to the vehicle network load amount stored in the DB 120, and, if the accumulated size for the parameters exceeds the network available capacity, parameter setting may be initialized.

Figure 4:
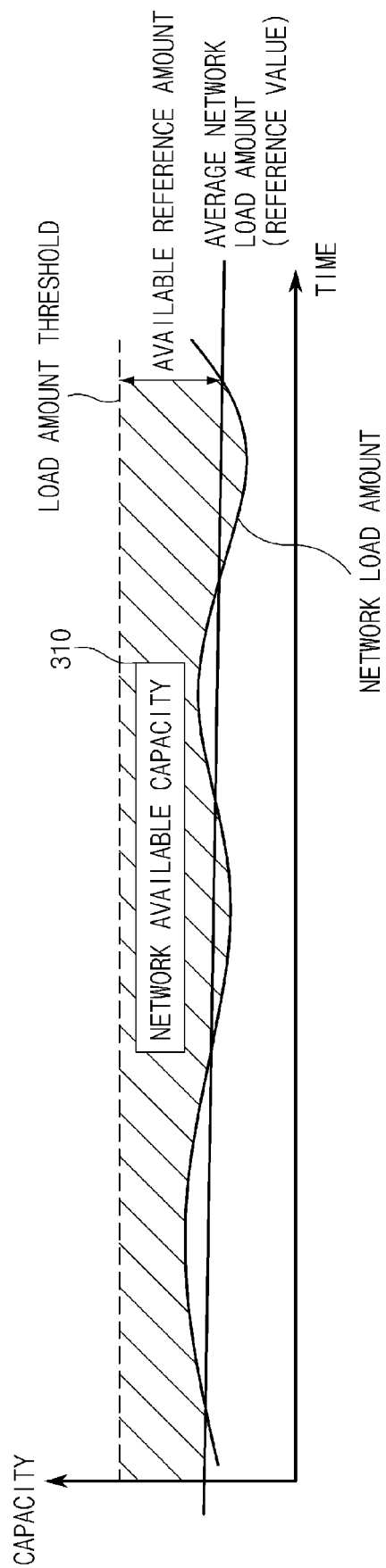

As shown in FIG. 4, the simulator 150 may decide the network available capacity based on the average load amount of network and the load amount threshold of vehicle network stored in the DB 120.

As a simulation result of the simulator 150, if the accumulated size for the selected parameters does not exceed the available capacity, the script generation unit 160 may generate a data collection request command by using the selected parameters. In this case, the data collection request command may be generated in a form of script. The data collection request command may be transmitted to the data collection device through the communication unit 130.

Figure 5:
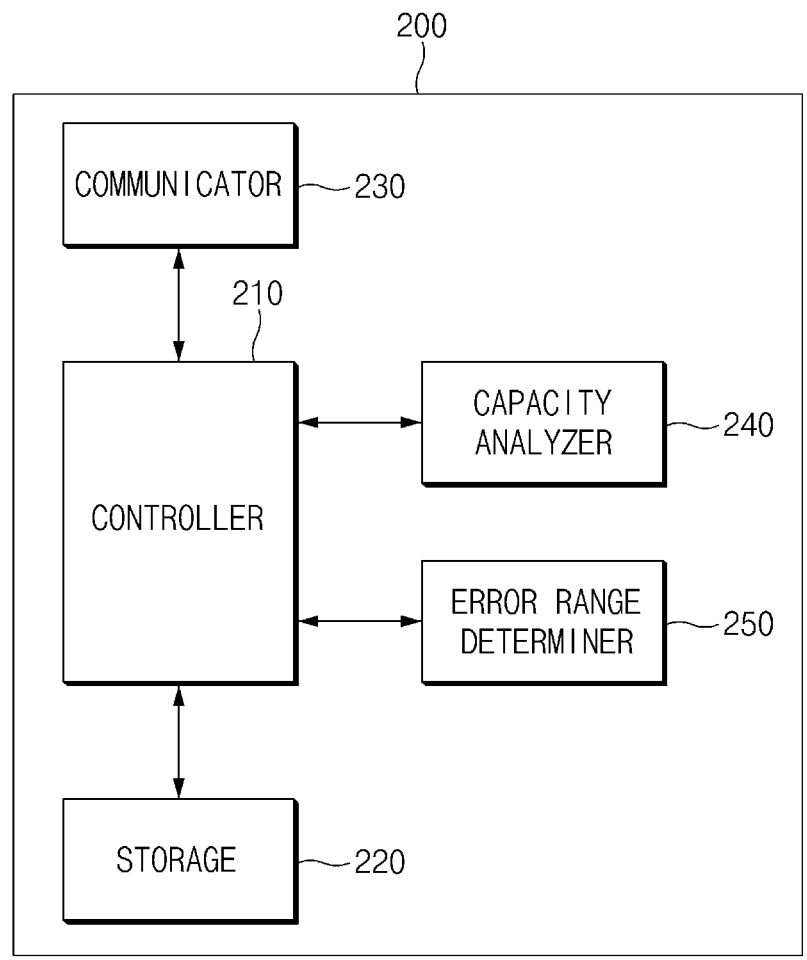
FIG. 5 is a block diagram illustrating a configuration of a data collection device according to embodiments of the present disclosure.

FIG. 5 is a block diagram illustrating a configuration of a data collection device according to embodiments of the present disclosure.

The data collection device 200 according to the present disclosure may be implemented in the interior of the vehicle. In this case, the data collection device 200 may be connected to the controllers of vehicle through vehicle network. As an example, the data collection device 200 may be connected to the vehicle controllers through a CAN communication line. Thus, the data collection device 200 may be integrally formed in the vehicle, or may be implemented as a separate device to be connected to the vehicle through an external connection means.

As shown in FIG. 5, the data collection device 200 may include a controller 210, a storage unit 220, a communication unit 230, a capacity analysis unit 240, and an error range determination unit 250. The controller 210 may process a signal transmitted between respective units of the data collection device 200.

The storage unit 220 may store temporarily a data set included in the data collection request signal received from the server, and may store the data received from the vehicle controller. Further, the storage unit 220 may store load state information on the vehicle network that connects the data collection device 200 to the vehicle controller, and may store information on error range according to the load state of the vehicle network. The storage unit 220 may include at least one storage media among a flash memory type, a hard disk type, a multimedia card micro type, card type memory (e.g., SD or XD memory and the like), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM).

The communication unit 230 may include a communication module supporting a communication interface with the server connected through a wireless network. The communication module may include a module for supporting a wireless Internet access such as a wireless local area network (WLAN), Wibro, Wi-Fi, Wimax, HSDPA and the like. Further, the communication unit 230 may include a communication module supporting a communication interface with the vehicle controller connected through the vehicle network. Here, the communication module may include a module supporting a vehicle network communication such as a controller area network (CAN) communication, a local interconnect network (LIN) communication, a Flex-Ray communication and the like. The communication unit 230 may receive the data collection request signal from the server, and may transmit the received data collection request signal to the vehicle controller connected to the vehicle network. The communication unit 230 may be connected respectively to communicate with a plurality of vehicle controllers provided in the vehicle. Further, the communication unit 230 may transmit an error range according to the load state of the vehicle network. Further, the communication unit 230 may receive data requested from the vehicle controller, and may transmit the received data to the server.

The capacity analysis unit 240 may check the load state of the vehicle network. As an example, the capacity analysis unit 240 may check the load amount threshold of vehicle network, and check the average load amount of the network for a certain period of time. In this case, the capacity analysis unit 240 may analyze the network available capacity from a difference between the load amount threshold of vehicle network and the average network load amount.

An error compensation unit may compare a difference between the average network load amount and the actual network load amount with respect to the vehicle network and determine the error range. The error range for the network available capacity is illustrated in FIG. 6.

Figure 6:
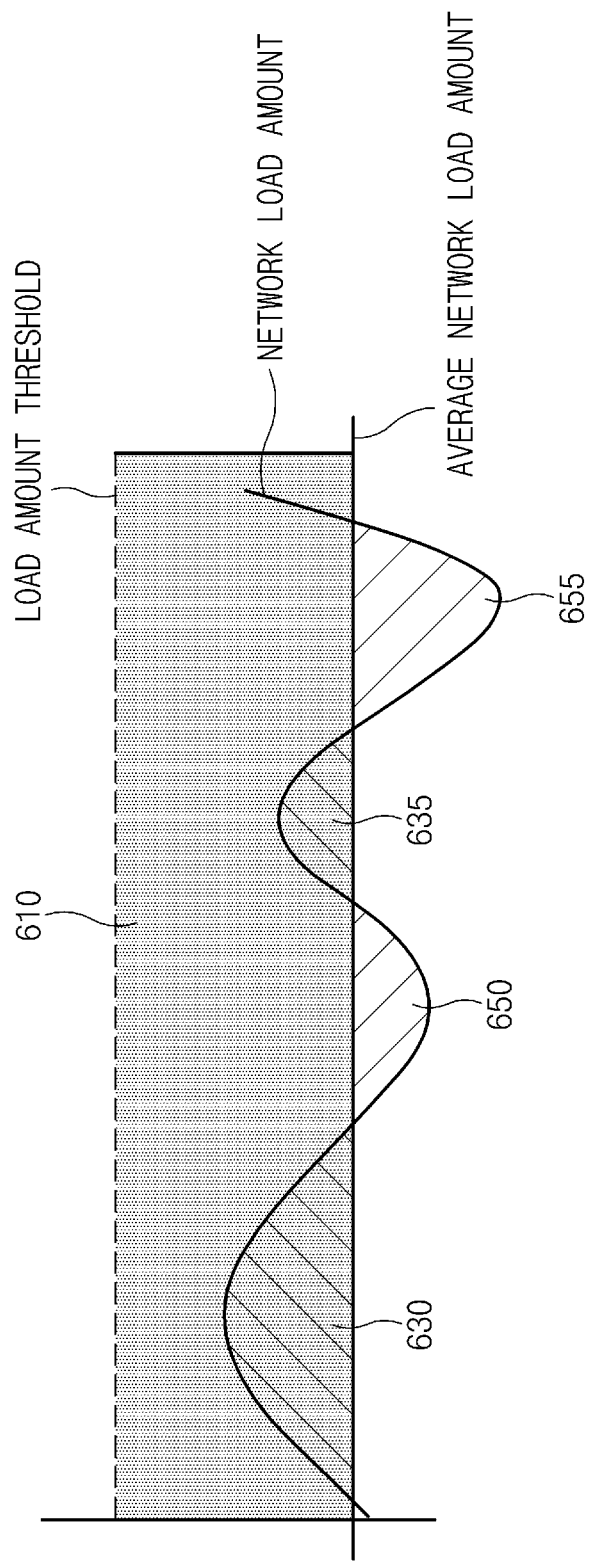
FIG. 6 is an exemplary diagram for illustrating an operation of a data collection device according to embodiments of the present disclosure.

Referring to FIG. 6, a network available capacity 610 may be determined by a difference between the load amount threshold of vehicle network and the average network load amount. However, the actual network load amount measured in real-time may be different from the average network load amount in some area.

That is, in the case of an area corresponding to reference numeral 630 and reference numeral 635, it may be determined that the actual network load amount is greater than the average network load amount. In addition, in the case of an area corresponding to reference numeral 650 and reference numeral 655, it may be determined that the actual network load amount is less than the average network load amount.

Therefore, the error compensation unit load may determine an area where a difference between the average network load amount and the actual network load amount occurs as the error range. Here, the information on error range according to the load state of the vehicle network may be transmitted to the vehicle controller together with the data collection command, when the data collection command received from the server is transmitted to the vehicle controller.

Figure 7:
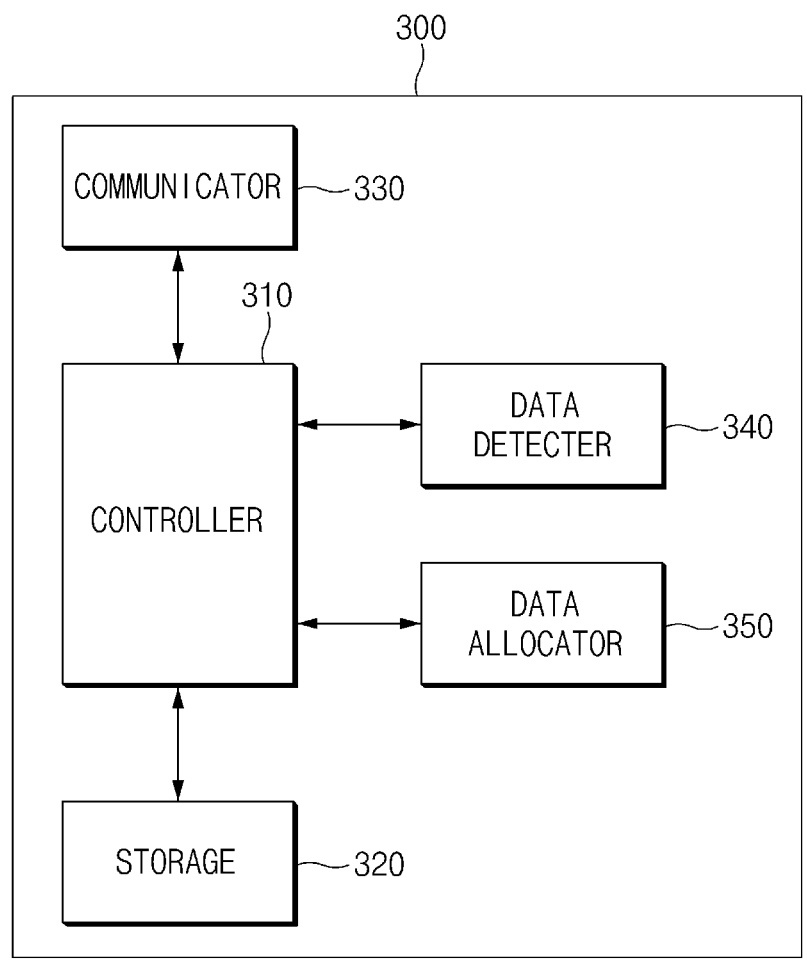
FIG. 7 is a block diagram illustrating a configuration of a vehicle controller according to embodiments of the present disclosure.

FIG. 7 is a block diagram illustrating a configuration of a vehicle controller according to embodiments of the present disclosure.

As shown in FIG. 7, the vehicle controller 300 according to the present disclosure may include a controller 310, a storage unit 320, a communication unit 330, a data detection unit 340, and a data allocation unit 350.

The controller 310 may process a signal transmitted between respective units. In addition, the controller 310 may control the operation of the unit corresponding to the vehicle controller 300, and may also adjust the setting for the operation of corresponding unit.

The storage unit 320 may store the operation state and result of the unit corresponding to the vehicle controller 300, and may store information generated when the vehicle controller 300 controls the operation of corresponding unit. Further, the storage unit 320 may store the setting value for the operation of the vehicle controller 300. As an example, the storage unit 320 may store data such as high and low speed CAN data according to main specification of control area network (CAN), CAN Calibration Protocol (CCP) that can read parameter information value of ECU, Xeline Control Protocol (XCP), and the like. Further, the storage unit 320 may store data in various formats according to the network type, such as a FlexRay, Most, Ethernet, and the like. The storage unit 320 may include at least one storage medium among a flash memory type, a hard disk type, a multimedia card micro type, a card type memory (e.g., SD or XD memory, etc.), a magnetic memory, a magnetic disk, an optical disk, a random access memory (RAM), SRAM, ROM, PROM, and EEPROM.

The communication unit 330 may include a communication module supporting the communication interface with a data collection terminal connected through the vehicle network. Here, the communication module may include a module supporting the vehicle network communication such as a controller area network (CAN) communication, a local interconnect network (LIN) communication, a flex-ray communication, and the like. In addition, the communication module may include a module supporting the short-range communication such as bluetooth, zigbee, ultra wideband (UWB), radio frequency identification (RFID), infrared data association (IrDA), and the like. The communication unit 330 may receive the data collection request signal and the error range information depending on the load state of vehicle network from the data collection device. Further, the communication unit 330 may transmit the data allocated in response to the data collection request to the data collection device.

The data detection unit 340 may parse the data sets included in the data collection request signal received from the data collection device, and check the parameter information. In this case, the data detection unit 340 may detect data corresponding to the requested parameter among the data stored in the storage unit 320. As an example, when the data set included in the data collection request signal includes 'Parameter1', 'Parameter2', 'Parameter3', 'Parameter4', 'Parameter5', the data detection unit 340 may detect data corresponding to 'Parameter1', 'Parameter2', 'Parameter3', 'Parameter4', 'Parameter5'.

The data allocation unit 350 may allocate the data detected by the data detection unit 340 to data stream. In this case, the data allocation unit 350 may allocate the data in consideration of the error range received from the data collection device. As an example, the data allocation unit 350 may divide respective data according to parameter unit, and allocate the divided data in consideration of the error range for each period. Thus, a detailed embodiment of allocating data is illustrated with reference to FIGS. 8a and 8b.

Figure 8A:
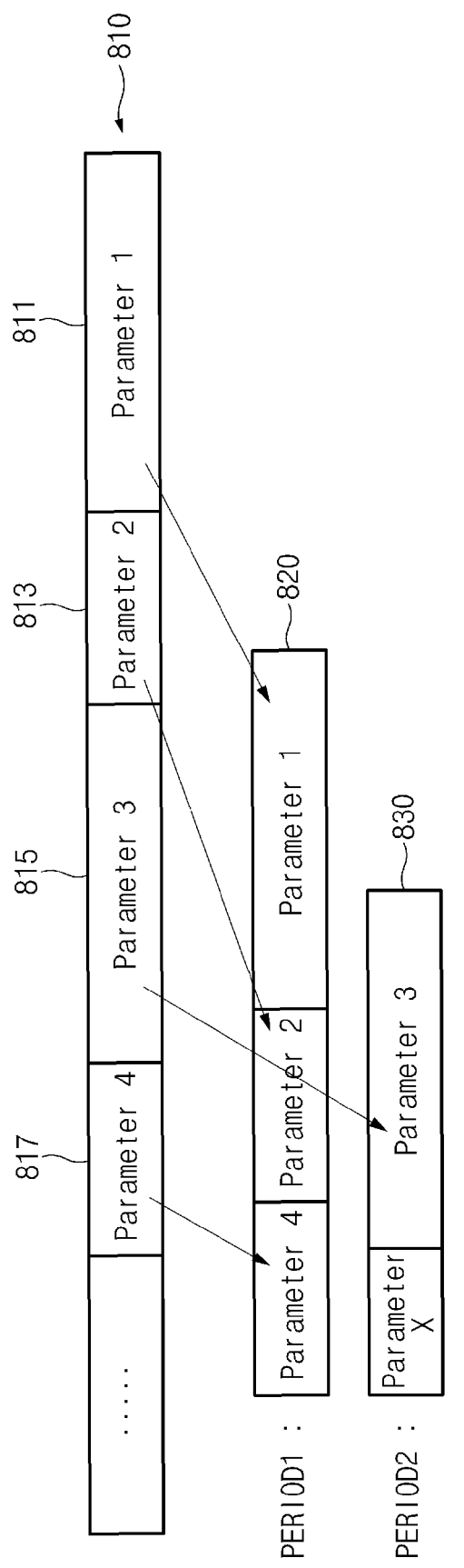
FIGS. 8a and 8b are exemplary diagrams for illustrating an operation of a vehicle controller according to embodiments of the present disclosure.

Referring to FIG. 8a, when the data detected by the data detection unit 340 is 'Parameter1', 'Parameter2', 'Parameter3', 'Parameter4', . . . , the data allocation unit 350 may arrange data in consideration of the load amount and the error range for the vehicle network.

In this case, the data allocation unit 350 may sequentially allocate a data stream 810, which waits to be transmitted, for each period from a first data according to the network load amount and the error range. In other words, 'Parameter1', 'Parameter2' may be allocated to an allocation space of a data stream 820 corresponding to period 1. When the size of 'Parameter3' exceeds the remaining allocation space of the data stream 820 corresponding to period 1, the data allocation unit 350 may allocate a data having a suitable size, e.g., a 'Parameter4', among the remaining data except 'Parameter3' to the remaining allocation space.

Then, the data allocation unit 350 may allocate 'Parameter3' to an allocation space of a data stream 823 corresponding to period 2.

Figure 8B:
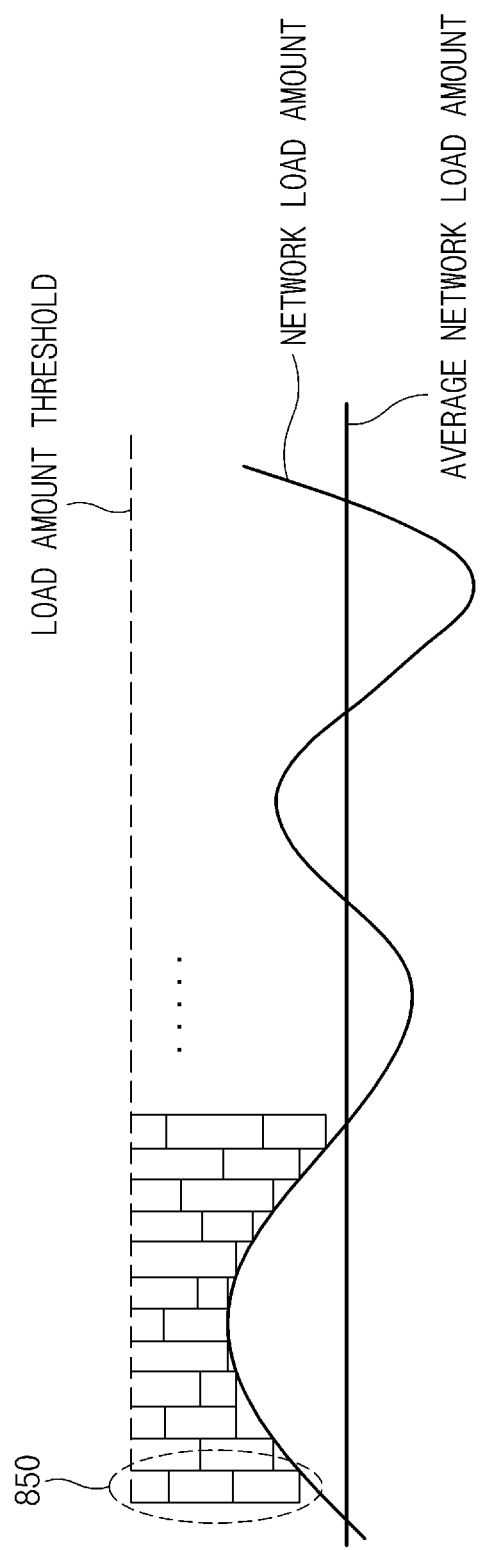

The data stream for each period to which data is allocated by the data allocation unit 350 may be allocated according to the actual network load amount as shown in FIG. 8b, thereby being transmitted to the data collection device through the communication unit 330.

Hereinafter, the operation flow of the apparatus according to the present disclosure configured as described above is illustrated in more detail.

Figure 9:
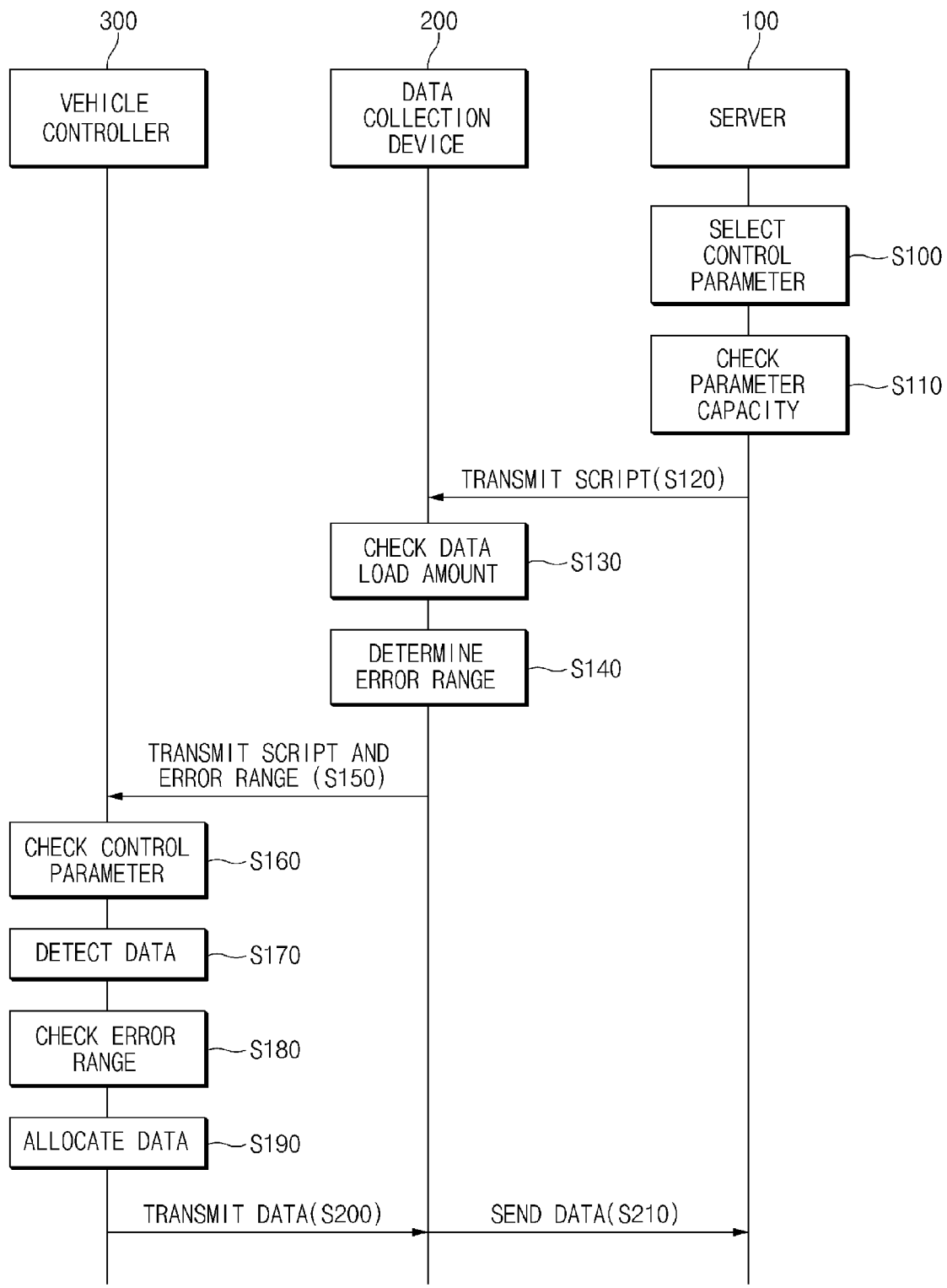
FIG. 9 is a flowchart illustrating an operation flow of a vehicle data collection method according to embodiments of the present disclosure.

FIG. 9 is a flowchart illustrating an operation flow of a vehicle data collection method according to embodiments of the present disclosure.

As shown in FIG. 9, first, the server 100 may select a control parameter for the vehicle controller 300 which collects data (S100). In this case, the server 100 may determine whether the accumulated size of control parameters selected at step 'S100' exceeds the network available capacity according to the load state of the vehicle network connected to the vehicle controller 300 (S110).

When the accumulated size of selected control parameters exceeds the network available capacity according to the load state of the vehicle network connected to the vehicle controller 300 at step 'S110', the server 100 may initialize the selection of parameter and repeat the step 'S100'.

On the other hand, when the accumulated size of selected control parameters exceeds the network available capacity according to the load state of the vehicle network connected to the vehicle controller 300 at step 'S110', the server 100 may configure a script which includes the selected control parameters to transmit to the data collection device 200 (S120).

When the script is received at step 'S120', the data collection device 200 may check the network load amount of the vehicle network for transmitting and receiving the data set included in the script (S130), and may determine the error range according to the network load state (S140). In this case, the data collection device 200 may determine the error range by comparing a difference between the average network load amount and the actual network load amount.

The data collection device 200 may transmit the script received at step 'S120', and information on the error range determined at step 'S140' to the vehicle controller 300 (S150). Thus, the vehicle controller 300 may check the control parameter included in the script (S160), and detect the data corresponding to the checked control parameter (S170).

The vehicle controller 300 may check the error range according to the network load state, before allocating the data detected at step 'S170' to the data stream (S180), and allocate the data in consideration of the checked error range (S190).

In this case, the vehicle controller 300 may allocate the data after rearranging the data to be adjusted to a data allocation range of the data stream for each period in consideration of the size of the data detected at step 'S170'. The embodiment of allocating data for each period was illustrated in the above description of FIGS. 8a and 8b.

The vehicle controller 300 may transmit the data stream to which data is allocated to the data collection device 200 (S200). In this case, the data collection device 200 may send the data received from the vehicle controller 300 to the server 100 (S210).

The above mentioned process may be directly implemented by a hardware, a software module, or a combination of the two executed by a processor. The software module may reside in a storage medium, that is, in a memory and/or a storage such as a RAM memory, a flash memory, a ROM memory, an EPROM memory, an EEPROM memory, a register, a hard disk, a removable disk, and CD-ROM. The exemplary storage medium may be coupled to a processor, and the processor may read information from the storage medium and write information to the storage medium. Alternatively, the storage medium may be integrated in the processor. The processor and the storage medium may reside in an application specific integrated circuit (ASIC). The ASIC may reside in a user terminal. Alternatively, the processor and the storage medium may reside in the user terminal as an individual component.

According to the present disclosure, the server monitors the vehicle network state periodically to actively induce to avoid network load of vehicle when adjusting a policy according to vehicle data collection. Further, according to the present disclosure, when adding data which was not existed in existing vehicle network, it may not affect the load amount of vehicle network even if operation is remotely controlled, thereby immediately collecting and applying required control data when storing and analyzing data in the server.

Although embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A system for collecting vehicle data, the system comprising:
   at least one vehicle controller in a vehicle network configured to control driving of a vehicle;
   a server configured to monitor a load state of the vehicle network and request a data collection by adjusting a control parameter corresponding to a selected vehicle controller according to an available capacity in the vehicle network when any one of the at least one vehicle controller is selected; and
   a data collection device configured to request data corresponding to the control parameter according to a request of the server by determining an error range based on the load state of the vehicle network, wherein the at least one vehicle controller detects the data corresponding to the control parameter and arranges and transmits the data corresponding to the control parameter based on the load state of the vehicle network and the error range.

2. The system of claim 1, wherein the server includes a simulator configured to determine the available capacity in the vehicle network based on a difference between a load amount threshold for the vehicle network and an average network load amount and compare the available capacity with a size of a control parameter selected in response to the selected vehicle controller.

3. The system of claim 2, wherein the server further includes a script generation unit configured to generate a script including the selected control parameter when the size of the selected control parameter does not exceed the available capacity according to the comparison of the simulator.

4. The system of claim 1, wherein the data collection device includes a capacity analysis unit configured to determine the load state of the vehicle network in real-time or at every predetermined period and provide the determined load state to the server.

5. The system of claim 1, wherein the data collection device includes an error range determination unit configured to compare a difference between an average network load amount for the vehicle network and an actual network load amount of the vehicle network and determine an error range of the actual network load amount.

6. The system of claim 1, wherein the at least one vehicle controller includes:
 a data detection unit configured to detect data corresponding to the control parameter by determining a control parameter included in the data collection request received from the data collection device; and
 a data allocation unit configured to separate the data detected by the data detection unit based on a control parameter unit and allocate data based on the error range for each data transmission period.

7. The system of claim 6, wherein the data allocation unit allocates sequentially the data separated based on the control parameter unit to a data allocation space of a data stream corresponding to each data transmission period based on a network load amount and an error range, and
 when a size of data allocated in a certain period exceeds the data allocation space of a corresponding data stream, allocates firstly data corresponding to the remaining allocation space among unallocated data except data allocated secondly in a corresponding period.

8. A method for collecting a vehicle data, the method comprising:
 receiving, by a data collection device, a command script from a server including a control parameter selected according to an available capacity for a vehicle network connected to a vehicle controller for controlling driving of a vehicle;

determining, by the data collection device, an error range according to a load state of the vehicle network in response to a request of the server;
 transmitting, by the data collection device, the command script received from the server and the error range to the vehicle controller;
 receiving, by the data collection device, data corresponding to the control parameter included in the command script from the vehicle controller according to the error range; and
 sending, by the data collection device, the data received from the vehicle controller to the server,
 wherein the data corresponding to control parameters are separated based on the control parameter and arranged for each period according to the load state of the vehicle network and the error range.

9. The method of claim 8, further comprising:
 before the receiving of the command script from the server:
 determining, by the server, an available capacity of the vehicle network based on a difference between a load amount threshold for the vehicle network and an average network load amount; and
 generating, by the server, the command script including the selected control parameter when a size of the selected control parameter does not exceed the available capacity.

10. The method of claim 8, wherein the transmitting of the command script and the error range to the vehicle controller comprises:
 comparing a difference between an average network load amount of the vehicle network and an actual network load amount of the vehicle network; and
 determining an error range of the actual network load amount.

11. The method of claim 8, further comprising:
 before the receiving of the data corresponding to the control parameter:
 detecting, by the vehicle controller, data corresponding to the control parameter by determining control parameters included in the command script;
 separating, by the vehicle controller, the detected data based on a control parameter unit; and
 sequentially allocating, by the vehicle controller, the data separated based on the control parameter unit to a data allocation space of a data stream corresponding to each data transmission period depending on a network load amount and the error range.

12. The method of claim 11, wherein the sequential allocating of the data comprises:
 when a size of data allocated in a certain period exceeds the data allocation space of a corresponding data stream, allocating firstly data corresponding to the remaining allocation space among unallocated data except data allocated secondly in a corresponding period.

* * * * *